Nov. 28, 1961     H. FRIEDMAN     3,011,055

METHOD AND MEANS FOR GAUGING FINE STRANDS

Filed June 3, 1954

INVENTOR.
HERBERT FRIEDMAN
BY

United States Patent Office 3,011,055
Patented Nov. 28, 1961

3,011,055
METHOD AND MEANS FOR GAUGING FINE STRANDS
Herbert Friedman, Arlington, Va., assignor, by mesne assignments, to J. J. Maguire, trading as J. J. Maguire Company, Washington, D.C.
Filed June 3, 1954, Ser. No. 434,152
15 Claims. (Cl. 250—52)

This invention relates to new and improved methods and means for gauging fine strands or the like and suitable for application to a moving continuous strand.

The continuous gauging of fine wires or fiber strands is a problem of considerable importance in the manufacture and handling of a wide variety of materials which are produced in this form. Due to the physical dimensions of strands of this type and the generally delicate nature thereof, gauging arrangements which involve mechanical contact with the strand leave much to be desired. Additional difficulties which have not been completely overcome relate to the sensitivity and resolution required for the measurement and control of very small diameter strands.

It is an object of the present invention to provide an improved method and means for gauging elongated strands.

Another object is the provision of arrangements for continuously gauging a moving strand.

A further object is the provision of an arrangement for measuring the effective diameter of a moving strand.

Still another object is the provision of arrangements for strand gauging of high sensitivity and resolution using alpha particles.

Another object is to provide a control operation in response to a high sensitivity strand gauging operation.

These and other objects of the invention will become apparent from the following detailed description taken in conjunction with the accompanying drawings in which.

Figure 1:
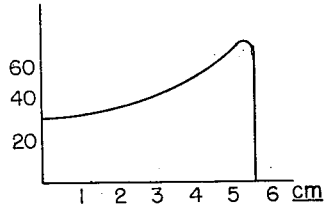
FIG. 1 is a chart useful in understanding the invention.

According to the present invention the relatively short range of alpha particles is utilized to gauge fine strands in a simple and convenient manner and with a high degree of sensitivity. The range of alpha particles in matter is sharply defined by the energy of the particles. Thus, for a given energy level, the distance the particles will travel in matter is proportional to the density of the transversed medium. The actual distance is of the order of a milligram per square centimeter per million electron volts of energy and in air a five million electron volt alpha particle will travel about five centimeters. The specific ionization produced by particles of this energy as a function of distance is shown in FIG. 1.

Because of the high rate of absorption of the alpha particle energy, any arrangement of an alpha energy source and a detector may be so adjusted that the energy absorbed by the air-path and detector window approaches the total energy of the particles. For this condition the residual range of the alpha particle is just sufficient to penetrate the fiber sample to be measured when it is interposed between the source and detector. A maximum sensitivity of the transmitted alpha ray energy to the thickness of the absorbing fiber is, therefore, obtained. With the present embodiments herein disclosed it has been found possible readily to measure strands having an extremely small diameter.

In one arrangement in accordance with the invention a channeled block is provided with an alpha particle source at the bottom of the channel. An alpha particle detector is suitably positioned to detect the emanations from the channel and indicate any variations in the average intensity thereof. A small strand placed in the channel absorbs alpha radiation in proportion to its mass and products variations in the indicated intensity representative of the mass or effective diameter of the strand.

Figure 2:
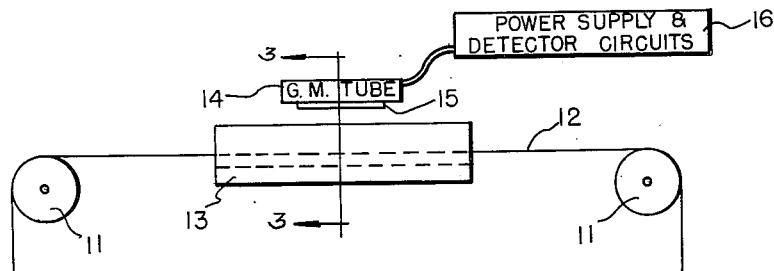
FIG. 2 is an elevation view of an arrangement for practicing the invention.

Referring now to FIG. 2, one arrangement in accordance with the present invention provides means 11 for transporting a thin strand 12 in any conventional manner during the manufacture or handling thereof. The strand 12 passes through a channel guide block 13 which may be somewhat elongated in the direction of travel of the strand 12. Positioned above the channel is a detector tube 14 having an elongated radiation permeable window 15 parallel to the channel. The detector tube 14 may be an ionization chamber proportional counter, Geiger counter, scintillation counter or any other detector sensitive to alpha radiation. Power supply and detector circuits 16 are connected to the tube 14 in any well known manner for detecting alpha radiation.

Figure 3:
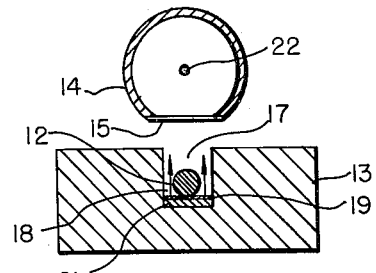
FIG. 3 is a sectional view taken along the line 3—3 of FIG. 2.

In FIG. 3 the guide block 13 is shown with a rectangular channel opening 17 which permits the upwardly directed radiation to emerge therefrom. At the base of the opening 17 an alpha radiation source 18 is secured. The source 18 can be made up, for example, of a strip of radium impregnated foil 19 supported on a heavy backing material 21 and covered with a very thin nickel flashing on the emitting surface. Within the channel opening 17 the strand 12 is guided in a position to absorb a portion of the radiation from the surface of foil 19. Directly above the channel opening 17 the detector tube 14 is positioned with the window 15 preferably of size to receive substantially all radiation emanating from the channel opening 17. The tube 14 is shown as a coaxial type with a central electrode 22 surrounded with the concentric envelope electrode 14 which has the window 15 supported therein. Other tube structures can, of course, be used such as a parallel plate tube having a lower plate with an aperture slot for admitting the radiation.

The active length of the tube 14 is essentially that of the window 15 which, as has been stated, is elongated in the direction of the strand 12. In like manner the source 18 preferably has the emitter foil 19 extended in the base of the channel 17 to be at least coextensive with the length of the window 15. This arrangement together with the use of a strong emitter of alpha particles for the source 18 enhances the gauging operation due to the statistical nature of the process. It has also been observed that with the arrangement of FIG. 3 the transverse position of the strand 12 in the slot 17 has a negligible effect on the measurement of the strand.

Figure 4:
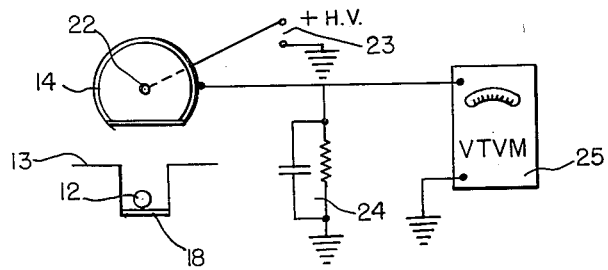
FIG. 4 is a schematic view of an arrangement for indicating strand diameters.

In FIG. 4 a simple measuring circuit is provided to indicate the thickness of the strand 12. The tube 14, channel 13 and strand 12 are arranged as previously described. Electrode 22 is energized from a high voltage supply 23 and the outer electrode 14 is returned to ground through a resistor-capacitor circuit 24. A vacuum tube voltmeter 25 is connected to measure the average voltage developed across the circuit 24 and may be calibrated to indicate strand diameter directly. Since the absorption of the strand 12 reduces the voltage developed in the output circuit 24 of the detector, the relationship of strand diameter to measured voltage magnitude is inverse.

Figure 5:
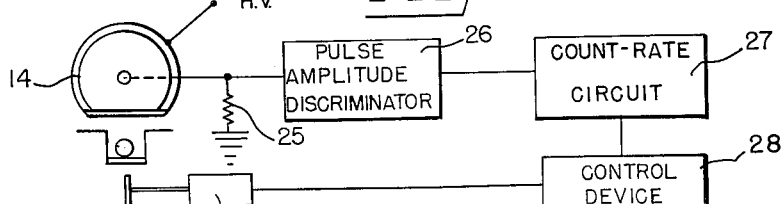
FIG. 5 is a schematic view of a modification.

The circuit arrangement shown in FIG. 4 is especially useful where the energy source 18 is substantially a pure alpha particle emitter. For some conditions other circuits may be employed as well as modifications in the end use of the detected signal. For example, if radium is used for the source 18, the beta and gamma radiation therefrom constitute a large undesired background noise for the desired alpha radiation. Under these conditions the circuit of FIG. 5 may be used to discriminate against the undesired background noise. In this circuit the detector output circuit comprises a resistor 26 which develops pulse voltage in response to the ionization of the tube 14. The pulse voltage across resistor 25 is applied to a pulse amplitude discriminator 26. The pulse amplitude selection of the circuit 26 is adjusted in conjunction with a proportional counter 27 to provide complete rejection of the beta and gamma counts while retaining high efficiency for alpha ray detection in a manner well known in the art. In like manner circuit 27 could utilize a scintillation counter to obtain discrimination in favor of the alpha counts.

If desired, the output signal of the counting circuit 27 (or of the averaging circuit 24 of FIG. 4) can be utilized for control purposes instead of or in conjunction with indication. Thus, for example, the output of the counter circuit 27 can be applied to a control device 28 to effect proportional or limit magnitude control as desired. If it were desired to control the speed of the strand 12 through the channel 13 in accordance with the diameter of the strand 12, the control device could comprise a running speed control for a reeling motor 29.

Many modifications will now be apparent to those skilled in the art in the light of the above teachings which are exemplary. The scope of the present invention, therefore, is not to be limited to the disclosed embodiments but is defined by the appended claims.

I claim:

1. Apparatus for gauging a fine strand comprising, a source of alpha radiation, a detector for receiving a predetermined flux of said radiation, means for interposing said strand between said source and said detector to absorb a portion of the radiation incident upon said detector, the spacing of said source and said detector being less than the range of said alpha radiation through air and greater than the range of said alpha radiation through a path including said strand and means responsive to said detector in accordance with the incident alpha radiation representative of the absorption of said strand.

2. Apparatus for gauging a fine strand comprising, a source of alpha radiation, an alpha detector, means for supporting said detector to receive a predetermined radiation flux from said source and at a distance just within range of said radiation, means for interposing said strand between said source and said detector to absorb a portion of said radiation flux incident upon said detector, and means responsive to said detector in accordance with the incident alpha radiation representative of the absorption of said strand.

3. Apparatus for gauging a fine strand comprising, an elongated metal block having a longitudinal slot therein, a strip of alpha particle emitter in the bottom of said slot, an alpha detector positioned to detect radiation emerging from said slot, means for introducing said strand into said slot to absorb a portion of the radiation incident upon said detector, and means responsive to said detector in accordance with the incident alpha radiation representative of the absorption of said strand.

4. Apparatus for gauging a fine strand comprising, an elongated metal block having a longitudinal slot therein, a strip of alpha particle emitter in the bottom of said slot, an alpha detector positioned to detect radiation emerging from said slot and at a distance just within the range of said radiations, means for introducing said strand into said slot to absorb a portion of the radiation incident upon said detector, and means responsive to said detector in accordance with the incident alpha radiation representative of the absorption of said strand.

5. Apparatus according to claim 4 in which said means for introducing said strand includes means for continually moving said strand longitudinally through said slot.

6. Apparatus according to claim 4 in which said strip and the radiation responsive area of said detector are both elongated in the direction of said slot.

7. Apparatus according to claim 6 in which said means for introducing said strand includes means for continually moving said strand longitudinally through said slot.

8. A fine strand measuring system comprising, a metal channel, an elongated strip of alpha particle emitter in the bottom of said channel, an ionizable detector having an elongated radiation permeable window positioned to receive radiation from said strip emerging from said channel and at substantially the maximum distance for being ionized by said radiation, means for drawing said strand through said channel and indicator means responsive to the average ionization current of said detector.

9. A fine strand gauging system comprising, a metal channel, an elongated radiation source in the bottom of said channel, an ionizable detector having an elongated radiation permeable window positioned to receive radiation from said source emerging from said channel and at substantially the maximum distance for being ionized by the alpha radiation from said source, pulse amplitude discriminator means selectively responsive to the ionization pulses of said detector produced by alpha radiation, means for drawing said strand through said channel, and counting-rate means responsive to the selected alpha amplitude pulses.

10. Apparatus according to claim 9 and including a controlled device with control means therefor responsive in accordance with the counting-rate of said alpha pulses.

11. Apparatus for gauging a fine strand comprising, a source of particle radiation including alpha radiation, a radiation detector, means for supporting said detector to receive a predetermined radiation flux from said source and at a distance just within range of the alpha radiation from said source, means for interposing said strand between said source and said detector to absorb a portion of the radiation incident upon said detector, and amplitude discriminating means responsive to the alpha amplitude pulses of said detector.

12. The method of gauging fine strands which comprises, the steps of directing a predetermined flux of alpha radiation toward an alpha detector, interposing said strand to absorb a portion of said radiation flux incident upon said detector, indicating the absorption of said alpha radiation by said strand and spacing said source and said detector just within the range at which unabsorbed radiation will energize said detector.

13. Apparatus for gauging a fine strand comprising, a source of alpha radiation, a collimator for collimating radiation from said source, an alpha detector, means positioning said detector to receive said collimated radiation and at a distance slightly less than the maximum distance at which said collimated alpha radiation can be detected by said detector, means for positioning said strand to absorb a portion of said collimated radiation incident on said detector, and means responsive to said detector in accordance with the amount of said collimated alpha radiation detected.

14. Apparatus for gauging a fine strand comprising, a source of alpha radiation, a collimator for collimating radiation from said source into a beam of predetermined width, an alpha detector, means positioning said detector to receive said beam and at a distance slightly less than the maximum distance at which said alpha beam can be detected by said detector, means for positioning said strand within said beam to absorb a portion of said beam incident on said detector, said width of said beam being only slightly greater than the transverse dimension of said strand, and means responsive to said detector in accordance with the amount of alpha energy detected from said beam.

15. Apparatus for gauging a fine strand of predetermined nominal diameter comprising an elongated metal block having a longitudinal slot therein, said slot being slightly wider than said diameter, an alpha radiation source positioned to radiate a collimated beam out of said slot, an alpha detector positioned to detect radiation emerging from said slot and at a distance slightly less than the maximum distance at which alpha radiation from said source can be detected by said detector, means for positioning said strand to absorb a portion of said emerging radiation, and means responsive to said detector in accordance with the amount of alpha energy detected from said beam.

References Cited in the file of this patent

UNITED STATES PATENTS

| | | |
|---|---|---|
| 2,525,292 | Fua et al. | Oct. 10, 1950 |
| 2,640,788 | Rockett | June 2, 1953 |